(12) United States Patent
Raybold et al.

(10) Patent No.: US 7,467,519 B2
(45) Date of Patent: Dec. 23, 2008

(54) ELECTRICITY AND SYNTHESIS GAS GENERATION METHOD

(75) Inventors: Troy Michael Raybold, Orchard Park, NY (US); Raymond Francis Drnevich, Clarence, NY (US); James Patrick Meagher, Buffalo, NY (US)

(73) Assignee: Praxair Technology, Inc., Danbury, CT (US)

( * ) Notice: Subject to any disclaimer, the term of this patent is extended or adjusted under 35 U.S.C. 154(b) by 597 days.

(21) Appl. No.: 11/199,256

(22) Filed: Aug. 9, 2005

(65) Prior Publication Data

US 2007/0033949 A1 Feb. 15, 2007

(51) Int. Cl.
F02C 3/28 (2006.01)
F02C 6/18 (2006.01)
F02C 7/224 (2006.01)

(52) U.S. Cl. .................... 60/780; 60/39.12; 60/736; 60/39.182

(58) Field of Classification Search ............ 60/780, 60/39.182, 39.463, 39.12, 736
See application file for complete search history.

(56) References Cited

U.S. PATENT DOCUMENTS

| | | | |
|---|---|---|---|
| 4,072,625 A | 2/1978 | Pinto | 252/373 |
| 4,932,204 A | 6/1990 | Pavel et al. | 60/39.02 |
| 5,247,907 A * | 9/1993 | Lee et al. | 122/1 R |
| 5,357,746 A | 10/1994 | Myers et al. | 60/39.182 |
| 5,394,686 A * | 3/1995 | Child et al. | 60/39.12 |
| 5,490,377 A | 2/1996 | James | 60/39.12 |
| 5,845,481 A | 12/1998 | Briesch et al. | 60/39.06 |
| 5,955,039 A * | 9/1999 | Dowdy | 60/39.12 |
| 6,167,692 B1 * | 1/2001 | Anand et al. | 60/39.182 |
| 6,596,780 B2 * | 7/2003 | Jahnke et al. | 60/39.12 |
| 7,076,957 B2 * | 7/2006 | Ahmed et al. | 60/780 |

FOREIGN PATENT DOCUMENTS

EP 575406 5/1997

OTHER PUBLICATIONS

Smith et al., "Evaluation of a 510-Mwe Destec GCC Power Plant Fueled with Illinois No. 6 Coal", EPRI Document (1992) pp. 3-15, 3-16, 3-19, 3-22, 3-23 and 3-27.
Erickson et al., "Design Considerations for Heated Gas Fuel", GE Document GER-4189B (2003).

* cited by examiner

*Primary Examiner*—Ted Kim
(74) *Attorney, Agent, or Firm*—David M. Rosenblum

(57) ABSTRACT

A method of generating electricity in synthesis gas in which a fuel is combusted in a gas turbine to generate the electricity that at least about 60 percent by volume is derived from a source independent of the synthesis gas. The synthesis gas is produced by reacting a hydrocarbon stream, by for example, partial oxidation, autothermal reforming or steam methane reforming. After the synthesis gas stream is cooled, heat is transferred from the heated synthesis gas stream to the fuel prior to combustion in the gas turbine. All or at least a portion of the heat is transferred at a temperature no greater than about 500° F. and at a flow ratio of the fuel to the gas turbine to the synthesis gas stream from at least about 1.5. The heating of the fuel to the gas turbine lowers fuel consumption and thereby the total expenses involved in generating electricity and syngas.

6 Claims, 2 Drawing Sheets

ELECTRICITY AND SYNTHESIS GAS GENERATION METHOD

FIELD OF THE INVENTION

The present invention provides a method of generating electricity and synthesis gas in which heat is transferred from a synthesis gas stream to a fuel fed to combustors of a gas turbine used in generating the electricity. More particularly, the present invention relates to such a method in which the heat is transferred at a low temperature of no greater than about 500° F. and the fuel fed to the gas turbine has a composition that is at least 60 percent volume derived from a source that is independent of the synthesis gas stream.

BACKGROUND OF THE INVENTION

Synthesis gases, that is, gases that contain hydrogen and carbon monoxide are produced by steam methane reforming, autothermal reforming, partial oxidation, either catalytic or non-catalytic. The resultant synthesis gas stream can be further processed in a water gas shift reactor to increase its hydrogen content and the hydrogen can be separated from the synthesis gas to produce a hydrogen product stream though pressure swing adsorption.

Gas turbines are very commonly located at synthesis gas production sites. In this regard, commonly, the fuel for both the gas turbine and the hydrocarbon containing reactant fed for the synthesis gas production is natural gas. Where such installations exist, the gas turbines are not normally thermally linked to the synthesis gas production. In integrated gasification combined cycles, however, the gas turbine and the synthesis gas production are both thermally and operationally linked in that the fuel to the gas turbine is the synthesis gas and the synthesis gas is reheated through heat transfer with the synthesis gas stream being produced.

For example, in EP 0 575 406 B1, fuel and oxygen are reacted in a partial oxidation reactor to produce a synthesis gas stream. After the synthesis gas stream is quenched and water is removed in a knock-out drum at high temperature, the synthesis gas stream is subjected to a water gas shift reaction at a temperature of between 260° C. and 472° C. The heat created by the exothermic shift reaction is used in downstream heat exchangers to reheat the fuel stream to the gas turbine to a temperature of about 390° C. The fuel for the gas turbine is derived entirely from the synthesis stream. In this regard, in cooling stages occurring subsequent to the water gas shift, water is removed from the synthesis gas stream. After sulfur removal, the synthesis gas is reheated and, as stated previously, used as fuel to the gas turbine. As can be appreciated, all of the cooling steps and water removal act to remove heat from the synthesis gas stream at low temperature levels. Much of this heat is simply dissipated without being recovered.

As will be discussed, the present invention, unlike the prior art related to the utilization of synthesis gas in integrated gasification combined cycles, relates to a method of generating electricity and synthesis gas in which a gas turbine is not coupled to the synthesis gas production by the use of the synthesis gas as the dominant fuel source. This allows the heat within the synthesis gas to be recovered at low temperature and transferred to the gas turbine fuel. This provides an increase in gas turbine efficiency and therefore a net cost savings.

SUMMARY OF THE INVENTION

The present invention provides a method for integrating electrical power generation with synthesis gas production. In accordance with the method, a synthesis gas is produced by reacting a hydrocarbon stream with a reactant to form a synthesis gas stream. The synthesis gas stream is subsequently cooled and water is removed. Additionally, a fuel is combusted in a gas turbine to generate the electrical power. At least about 60 percent by volume of the fuel is derived from a source that is independent of the synthesis gas. For example, the fuel to the gas turbine could be natural gas mixed with up to about 40 percent synthesis gas. Heat is transferred from the synthesis gas stream to the fuel prior to combustion in the gas turbine. At least a portion of the heat is transferred at a temperature of no greater than 500° F. and at a flow ratio of the fuel to the synthesis gas stream of at least 1.5. In this regard, heat transfer of low temperature streams is defined for purpose of the invention at a temperature of less than about 500° F.

By utilizing a fuel that in major part is not derived from the synthesis gas stream and ratios of flow rates of the fuel and the synthesis gas stream of 1.5 and greater, the low temperature heat, which in the prior art is simply dissipated, can be used to preheat fuel to the gas turbine. Such preheating decreases the fuel requirements of the gas turbine and therefore, the cost in producing electricity. Such a reduced cost can be applied to the entire integration of electricity and synthesis gas production, and therefore hydrogen production, to provide economic efficiencies in an integration of the present invention that are not obtained in the prior art.

The hydrocarbon stream can be reacted in a partial oxidation reactor or an autothermal reforming reactor or a steam methane reformer. Further, the hydrogen content of the synthesis gas stream can be increased by a water gas shift reaction.

Steam may also be generated. Hydrogen can be separated from the synthesis gas stream to also produce a calorific tail gas stream. The combustion of the fuel in the gas turbine produces a heated exhaust and the calorific tail gas stream is combusted in a burner by combustion supported at least in part with the heated exhaust from the gas turbine to generate further heat. The further heat can be transferred to feed water to raise steam.

Water can be removed from the synthesis gas stream after the water gas shift reaction and within first and second cooling stages in which the second of the cooling stages operating at a lower temperature than the first of the cooling stages. Each of the first and second cooling stages has a heat exchanger to cool the synthesis gas stream followed by a knock-out drum to collect the water. The heat transfer from the synthesis gas stream to the fuel takes place within the second of the cooling stages and then the first of the cooling stages and in the heat exchanger associated with each of the first and second cooling stages. Alternatively, water can be removed from the synthesis gas stream by cooling the synthesis gas stream after the water gas shift reaction within first second and third heat exchangers and then introducing the synthesis gas stream into a knock-out drum to collect the water. At least part of the fuel to the gas turbine is heated in the third heat exchanger. The third heat exchanger is positioned between the first and second heat exchangers.

The fuel gas stream can be heated within a heat exchanger having passages for the fuel, the synthesis gas stream and cooling water. The cooling water can be used to trim the operation or to provide a heat transfer fluid when the gas turbine is removed from service. Another alternative is to transfer heat from the synthesis gas stream to the fuel by transferring the heat from the synthesis gas stream to a circulating heat transfer fluid and then transferring the heat from the circulating cooling fluid to the fuel.

BRIEF DESCRIPTION OF THE DRAWINGS

While the specification concludes with claims distinctly pointing out the subject matter that Applicants regard as their invention, it is believed that the invention would be better understood when taken in connection with the accompanying drawings in which:

DETAILED DESCRIPTION

Figure 1:
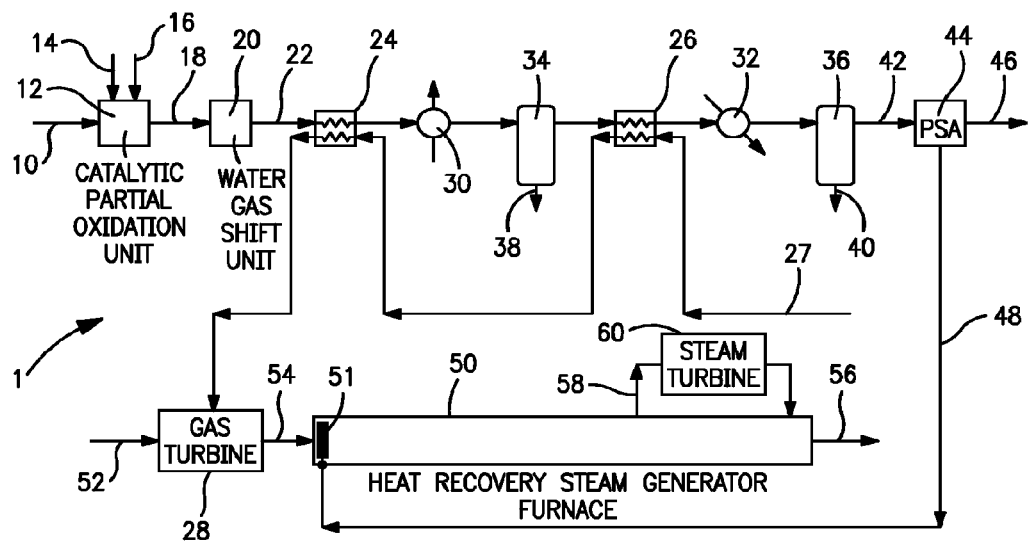
FIG. 1 is a schematic process flow diagram for carrying out a method in accordance with the present invention.

With reference to FIG. 1, an apparatus 1 for carrying out a method in accordance with the present invention is illustrated. A natural gas stream 10 is introduced into a catalytic partial oxidation reactor 12 along with an oxygen stream 14 and a steam stream 16. Catalytic partial oxidation reactor 12 contains a partial oxidation catalyst to promote partial oxidation of hydrocarbons contained within natural gas stream 10 to produce a synthesis gas stream 18 containing hydrogen, carbon monoxide, water and carbon dioxide. The synthesis gas stream 18 is introduced into a water gas shift unit 20 that includes a water gas shift reactor containing a shift catalyst as well as known heat exchangers for steam generation and preheating of feeds to catalytic partial oxidation reactor 12. For exemplary purposes synthesis gas stream 18 is produced at a temperature of 1750° F. and a pressure of about 315 psia. The natural gas stream 10, available at 77° F. and 330 psia, is introduced into the catalytic partial oxidation reactor 12 after being preheated within unit 20 to 475° F.

Water gas shift unit 20, by water gas shift conversion, increases the hydrogen content of the synthesis gas stream 18 to produce a synthesis gas stream 22 having a hydrogen content that is greater than that of synthesis gas stream 18. Synthesis gas stream 22 can have a temperature of about 700° F., a pressure of about 300 psia, and a flow rate of about 21.2 MMSCFD. Further, synthesis gas stream 22 can have a composition as follows: a hydrogen content of about 58.3 mol percent, a water content of about 17.3 mol percent, a carbon monoxide content of about 3.5 mol percent, a carbon dioxide content of about 18 mol percent and a methane content of about 2.9 percent. All of these percentiles are on a volume basis. The process heat contained within synthesis gas stream 22 is extracted by heat exchangers 24 and 26.

A gas turbine fuel stream 27, which can be natural gas having a flow rate of about 43.6 MMSCFD, is passed through heat exchange passes located within heat exchangers 24 and 26 and is then fed to a gas turbine 28. Gas turbine fuel stream 27 emerges from heat exchanger 26 at a temperature of about 245° F. and thereafter, from heat exchanger 24 at a temperature of about 370° F. before being introduced into gas turbine 28. As can be appreciated, gas turbine 28 is located as close as possible to catalytic partial oxidation unit 12 and water gas shift unit 20, heat exchangers 24 and 26 and etc. to minimize fuel pressure and heat losses.

Synthesis gas stream 22 is cooled in heat exchanger 24 to a temperature of about 375° F. and is then introduced into a heat exchanger 30 to preheat boiler feed water to near saturation for subsequent process steam generation within water gas shift unit 20, for instance to produce steam stream 16. The synthesis gas stream 22 exits heat exchanger 30 at about 260° F. and is further cooled to 110° F. in heat exchanger 26. A trim cooler 32 is provided for back-up cooling. The placement and use of heat exchanger 30 and trim cooler 32 will, however, be dictated by the steam requirements and the exact synthesis gas plant being utilized. Knock-out drums 34 and 36 are located down stream of heat exchanger 30 and heat exchanger 26 for condensate removal via streams 38 and 40, respectively. Knock-out drum 36 removes most of the condensate, typically over about 70 percent. The resultant cooled dry synthesis gas stream 42 is then separated in a pressure swing adsorption unit 44 ("PSA") that, as would be known in the art contains, for example beds of alumina, carbon and molecular sieve adsorbent. The beds operate out of phase in a known manner to produce a hydrogen product stream 46, here with 80 percent recovery and a flow rate of 9.9 MMSCFD and a PSA tail gas stream 48.

Since the catalytic partial oxidation reactor 12 does not require external firing, all of PSA tail gas stream 48 is routed to a heat recovery steam generator 50 containing a duct burner 51. Also introduced into heat recovery steam generator 50 is a heated exhaust stream 54 produced by gas turbine 28 through the combustion of fuel stream 27. Such combustion within gas turbine 28 is supported by an air stream 52 that is compressed within gas turbine 28.

Steam is generated within heat recovery steam generator 50 to produce a warm flue gas 56. Some steam through a steam stream 58 may be introduced into a steam turbine 60 for power generation.

Pre-heating fuel stream 27 to 370° F. reduces gas turbine fuel requirements for gas turbine 28 by approximately 0.87 percent. Furthermore, routing the PSA tail gas stream 48 to the heat recovery steam generator 50 boosts the power of steam turbine 60 by roughly 10 percent. This reduces the production costs of hydrogen product stream 46 through the generation of power by approximately 20 percent over production costs that would be required without such integration. In fact, hydrogen production costs of an integration such as illustrated in FIG. 1 and operated as described above yield production costs that become competitive with much larger facilities based on steam methane reforming. As indicated above, some of the heat in synthesis gas stream 22 is recovered at a temperature below 500° F. or more precisely, as low as about 110° F. This heat would if not recovered in accordance with the present invention would be dissipated or lost to the environment without the efficiency of the present invention being realized. The flow rate ratio of the fuel stream 27 and its makeup of entirely natural gas to the flow rate of the synthesis gas stream of about 2.0 allows such heat transfer and heat recovery in accordance with the present invention to take place. In practice, as indicated below for the embodiment of FIG. 2, such ratio is even higher but should in any case be greater than about 1.5.

Figure 2:
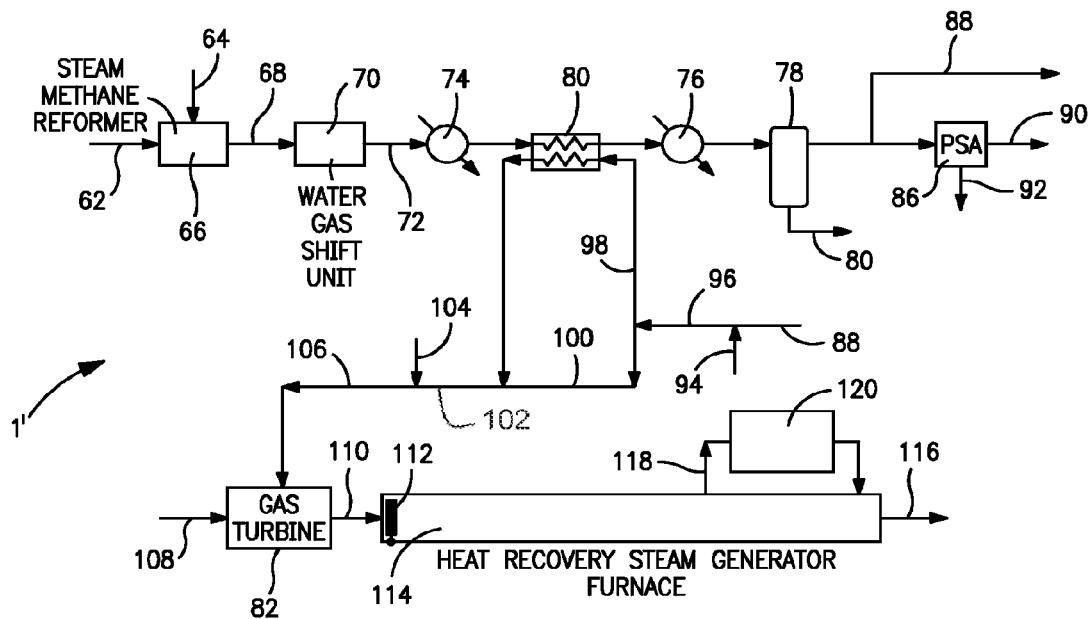
FIG. 2 is a process flow diagram of an alternative embodiment of the method in accordance with the present invention.

With reference to FIG. 2, an apparatus 1' is illustrated for carrying out a method in accordance with the present invention that involves steam methane reforming. In apparatus 1', a hydrocarbon containing feed stream 62 and a steam stream 64 are introduced into a steam methane reformer 66 to produce a synthesis gas stream 68 that contains hydrogen, carbon monoxide, water and carbon dioxide. Synthesis gas stream 68 is in turn introduced into a water gas shift unit 70 that consists of heat exchangers for steam generation and preheating of feeds to reformer 66 and a water gas shift reactor, as discussed above, to produce a synthesis gas stream 72 having increased hydrogen content over that of synthesis gas stream 68. Synthesis gas stream 72 is cooled within heat exchanger 74 and trim cooler 76 before being introduced into a knock-out drum 78 for removal of water 80. Synthesis gas stream 72 after having passed through heat exchanger 74 is introduced into a heat exchanger 80 to heat fuel to a gas turbine 82.

In heat exchanger 80, low value heat is recovered from the incoming synthesis gas stream 72 after having been cooled within heat exchanger 74 to a temperature that is between about 200° F. and about 700° F. Upon exiting the heat exchanger 80, the synthesis gas will be cooled typically to a temperature of about 150° F. or less for processing within PSA unit 86. A synthesis gas product stream 88 can be recovered along with a hydrogen product stream 90 and a psa tail gas stream 92 that can be used to fire burners within steam methane reformer 66.

A fuel stream 84 and a subsidiary fuel stream 94 as a combined stream 96 is in part introduced into heat exchanger 80 as a subsidiary stream 98. A remaining part of the combined stream 96, namely, subsidiary stream 100, is recombined with subsidiary stream 98 after having been heated within heat exchanger 80. The resultant heated combined stream 102 can be combined with a further subsidiary fuel stream 104 to produce fuel stream 106 to be introduced into gas turbine 82 along with air 108 to produce a heated exhaust stream 110. Subsidiary fuel stream 94 and fuel stream 84 could be partly composed of synthesis product gas stream 88 provided that at least about 60 percent of subsidiary fuel stream 98 is derived from a source independent of the synthesis gas stream 88. Subsidiary fuel stream 94 and subsidiary fuel stream 104 are optional and could be formed from the synthesis gas product stream 88.

It is to be further pointed out that the heat transfer arrangement illustrated herein could be employed with a catalytic partial oxidation unit, such as unit 12 or optionally, the heat transfer arrangement of FIG. 1 could be employed with a steam methane reformer, such as designated by reference number 66. The advantage of the heat exchange arrangement of fuel flows used in connection with heat exchanger 80 is that the temperature of the fuel fed to the gas turbine can be controlled by mixing the heated fuel stream from heat exchanger 80 with an incoming ambient part of the stream 100. However, as indicated in examples below, all of the fuel could be routed through heat exchanger 80.

Fuel stream 106 is at a temperature of no greater than 400° F. which is the maximum allowable temperature contained in many manufacture-recommendations for gas turbines. The heated gas turbine exhaust 110 is introduced into a burner 112 within a heat recovery steam generator 114 to generate steam and a cooled flue gas stream 116. Again, a steam stream 118 can be routed to a steam turbine 120 for power recovery.

Figure 3:
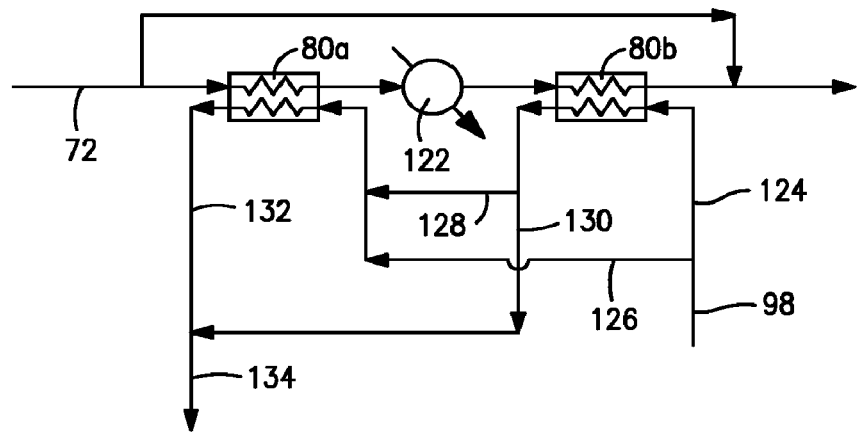
FIG. 3 is an alternative heat exchange configuration of the present invention that is exemplified with respect to the method of FIG. 2.

With reference to FIG. 3, although heat exchanger 80 is illustrated as a single unit in FIG. 2, multiple heat exchangers such as 80a and 80b could be provided with process heat exchanger 122 situated between heat exchangers 80a and 80b. The fuel gas 98 in such case can be divided into first and second subsidiary streams 124 and 126. The first subsidiary fuel stream 124 after having been heated in heat exchanger 80b is divided into third and fourth subsidiary fuel streams 128 and 130. Third subsidiary fuel stream 128 is combined with second subsidiary fuel stream 126 and introduced into heat exchanger 80a to produce a heated combined fuel stream 132 that is further combined with second subsidiary fuel stream 130 to produce a fuel stream 134 that would be introduced into a gas turbine such as gas turbine 82 as illustrated with respect to FIG. 2.

Figure 4:
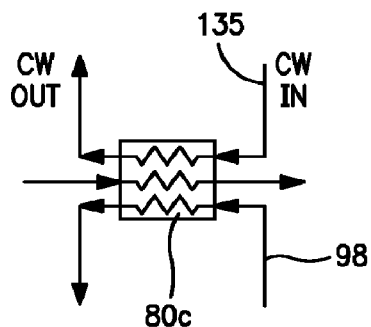
FIG. 4 is an alternative heat exchange configuration of the present invention that is exemplified with respect to the method of FIG. 2.

With reference to FIG. 4, heat exchanger 80 or heat exchangers 24 or 26 may be replaced by heat exchanger 80c in which a third cooling stream 135 such as water would only provide trim cooling and for cooling during periods in which gas turbine 82 is brought off line.

Figure 5:
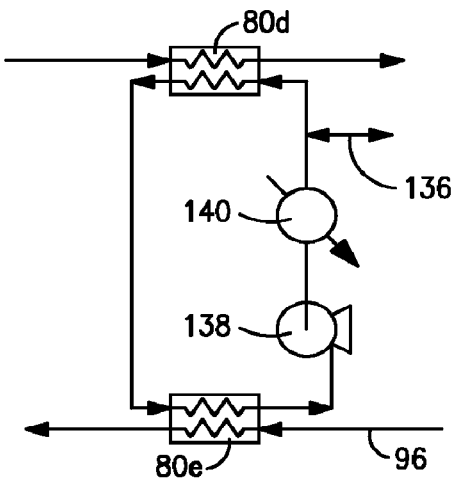
FIG. 5 is an alternative heat exchange configuration of the present invention that is exemplified with respect to the method of FIG. 2.

With reference to FIG. 5, heat exchanger 80, or either of the heat exchangers 24 or 26 for that matter, might be replaced with heat exchangers 80d and 80e that employ a heat transfer fluid, for instance, water circulating through a heat transfer circuit. A water stream 136 is introduced into the heat transfer circuit and then pumped to high pressure by pump 138. Excessive temperatures are moderated by a circuit cooler 140.

The following are calculated examples illustrating a variety of possible operational schemes for the embodiment of Applicant' invention as carried out in FIG. 2. Unless otherwise specified, in all examples, gas turbine 82 is a Model 7FA gas turbine manufactured by General Electric Energy (4200 Wildwood Parkway, Atlanta, Ga. 30339) being fed with a fuel stream 106 made up of natural gas fuel having the following composition: 92.1 mol % $CH_4$, 3.4% $C_2H_6$, 3.2% $N_2$, 0.7% $CO_2$, 0.6% $C_3H_8$, a pressure of about 325 psia, a temperature of about 60° F. and a nominal flow rate of about 4675 lb-mol/hr. The manufacturer's recommended maximum allowable fuel temperature is set at about 400° F. The synthesis gas stream 72 is cooled to a target temperature in a range of between about 70° F. and about 120° F. prior to water removal in knock-out drum 78 and further processing within PSA unit 86. Additionally, it is assumed that heat exchanger 80 is designed with 3 psi pressure drop on both the synthesis gas and fuel sides and with a 30° F. pinch. A further assumption is that the additional gas turbine fuel pressure drop can be managed by the pipeline or fuel compressor used in connection with the source of natural gas.

EXAMPLE 1

For purposes of this example, synthesis gas stream 72 has a flow rate of about 860 lb-mol/hr and has the following composition: 48 mol percent hydrogen, 35.7 mol percent water, 1.9 mol percent carbon monoxide, 10.8 mol percent carbon dioxide, 0.6 mol percent nitrogen and 3.0 mol percent methane. After passage through heat exchanger 74, synthesis gas stream 72 has a pressure of about 238 psia and a temperature of about 372° F. Assuming a hydrogen recovery of about 83 percent, approximately 3.12 MMSCFD hydrogen would be produced for hydrogen product stream 90. In heat exchanger 80, the synthesis gas stream 72 is further cooled to 100° F. against subsidiary stream 98 that constitutes about 62 percent of combined stream 96. Subsidiary stream 98 emerges from heat exchanger 80 at a temperature of about 322° F., which upon mixing with subsidiary stream 100, produces fuel stream 106 at a temperature of about 227° F. In this example no additional fuel is used and hence, subsidiary fuel streams 94 and 104 are not present. The 30° F. pinch point is assume to occur near the warm end of heat exchanger 80. The resulting preheated fuel stream 106 is calculated to decrease fuel consumption of gas turbine 82 by about 0.49 percent.

EXAMPLE 2

This example is a modification of Example 1 in which synthesis gas stream 72 has a flow rate of about 1385 lb-mol/hr and the same composition and temperature and pressure after having been cooled in heat exchanger 74. Again, assuming a recovery of hydrogen of about 83 percent, about 5.02 MMSCFD hydrogen would be produced for hydrogen product stream 90. Furthermore, in this example it is assumed that all of fuel stream 84 passes through heat exchanger 80 to cool synthesis gas stream 72 to about 100° F. The resultant fuel stream 106 has a temperature of about 322° F., which decreases fuel consumption by about 0.76 percent.

EXAMPLE 3

This example is similar to that of Example 2, but with synthesis gas stream 72 having a different composition than that previously considered due to additional process heat recovery within water gas shift unit 70. In this regard, for purposes of this example, synthesis gas stream 72 is assumed to have the following composition: 63.9 mol percent hydrogen, 13.2 mol percent water, 2.8 mol percent carbon monoxide, 14.1 mol percent carbon dioxide, 0.7 mol percent nitrogen and 5.3 mol percent methane. As a result of the additional process heat recovery, synthesis gas stream 72 has a lower stream temperature after heat exchanger 74, namely 277° F. as opposed to 372° F. in the previous examples and consequently a lower moisture content due to condensation removed in an upstream knock-out drum that as would be known in the art could be associated with water gas shift unit 70. Further, in this example, synthesis gas stream 72 must only be cooled from about 277° F. to about 110° F. As such, about 2300 lb-mol/hr of synthesis gas stream 72 is cooled against all of the fuel stream 84 to produce 11.12 MMSCFD hydrogen for hydrogen product stream 90. Under such conditions, fuel stream 106 has a calculated temperature of about 247° F., which decreases fuel consumption by 0.54 percent.

EXAMPLE 4

While previous examples have all considered a 7FA-based power plant, any power plant based on one or more gas turbines is suitable. For instance, a 6FA-based plant would nominally use 2150 lb-mol/hr of the previously specified natural gas as fuel stream 106, while a 207FA combined cycle plant would nominally use 9350 lb-mol/hr of natural gas. For such plants, proportionally less or more of the synthesis gas could be cooled. For instance, Example 4 shows that, when all 7FA gas turbine fuel is routed through heat exchanger 20, 2300 lb-mol/hr of synthesis gas stream 72 could be cooled from about 277° F. to about 110° F. For a 6FA plant, about 1058 lb-mol/hr of synthesis gas stream 72 could be cooled, while for a 207FA plant, about 4600 lb-mol/hr of synthesis gas stream 72 could be cooled. Synthesis gas stream 72 for such purposes is assumed to have the composition set forth in Example 4. This translates to about 5.11 and about 22.24 MMSCFD $H_2$ production, respectively. For all three foregoing cases, fuel stream 106 emerges preheated to 247° F., which decreases fuel consumption by about 0.5 percent. Obviously, annual fuel savings would be proportionally greater/smaller for larger/smaller gas turbines.

Although the present invention has been described in connection with steam methane reforming and catalytic partial oxidation, the present invention could be employed in connection with an autothermal reformer.

While the present invention has been described with reference to a preferred embodiment, as will occur to those skilled in the art, numerous changes, additions and omissions can be made without departing from the spirit and the scope of the present invention.

We claim:

1. A method for integrating electrical power generation with synthesis gas production comprising:
    producing the synthesis gas by reacting a hydrocarbon stream with a reactant to form a synthesis gas stream and cooling and removing water from the synthesis gas stream;
    combusting a fuel in a gas turbine to generate the electrical power, at least about 60 percent by volume of the fuel being derived from a source that is independent of the synthesis gas;
    transferring heat from the synthesis gas stream to the fuel prior to combustion in the gas turbine, at least a portion of the heat being transferred at a temperature no greater than about 500° F. and at a flow rate ratio of the fuel to the synthesis gas stream of at least about 1.5; and
    increasing the hydrogen content of the synthesis gas stream by a water gas shift reaction, wherein:
    steam is also generated;
    the hydrogen is separated from the synthesis gas stream to produce a calorific tail gas stream;
    combustion of the fuel in the gas turbine produces a heated exhaust;
    the calorific tail gas stream is combusted in a burner by combustion supported at least in part with the heated exhaust from the gas turbine to generate further heat; and
    the further heat is transferred to feed water to raise the steam.

2. The method of claim 1, wherein
    water is removed from the synthesis gas stream after the water gas shift reaction and within first and second cooling stages, the second of the cooling stages operating at a lower temperature than the first of the cooling stages and each of the first and second cooling stages having a heat exchanger to cool the synthesis gas stream followed by a knock-out drum to collect the water; and
    the heat transfer from the synthesis gas stream to the fuel takes place within the second of the cooling stages and then the first of the cooling stages and in the heat exchanger associated with each of the first and second cooling stages.

3. The method of claim 1, wherein:
    water is removed from the synthesis gas stream by cooling the synthesis gas stream after the water gas shift reaction within first second and third heat exchangers and then introducing the synthesis gas stream into a knock-out drum to collect the water; and
    at least part of the fuel to the gas turbine is heated in the third heat exchanger, the third heat exchanger being positioned between the first and second heat exchangers.

4. The method of claim 1 or claim 3, further comprising expanding at least part of the steam in an expander.

5. The method of claim 1 or claim 3, further comprising heating the fuel stream within a heat exchanger having passages for the fuel, the synthesis gas stream and cooling water.

6. The method of claim 1 or claim 3, wherein the heat is transferred from the intermediate product stream to the fuel by transferring the heat from the synthesis gas stream to a circulating heat transfer fluid and transferring the heat from the circulating cooling fluid to the fuel.

* * * * *